United States Patent [19]
Hayes

[11] Patent Number: 6,006,279
[45] Date of Patent: Dec. 21, 1999

[54] PLUG-IN MODULE HOST FRAMEWORK

[75] Inventor: Persnaz Neli Hayes, Anaheim Hills, Calif.

[73] Assignee: Canon Information Systems, Inc., Irvine, Calif.

[21] Appl. No.: 08/784,542

[22] Filed: Jan. 21, 1997

[51] Int. Cl.[6] .................................................... G06F 9/44
[52] U.S. Cl. ......................................................... 709/302
[58] Field of Search ................................... 395/680, 682; 709/300, 302

[56] References Cited

U.S. PATENT DOCUMENTS

| | | | |
|---|---|---|---|
| 5,247,681 | 9/1993 | Janis et al. | 709/305 |
| 5,375,241 | 12/1994 | Walsh | 709/305 |
| 5,379,432 | 1/1995 | Orton et al. | 709/303 |
| 5,404,528 | 4/1995 | Mahajan | 709/305 |
| 5,410,698 | 4/1995 | Danneels et al. | 709/305 |
| 5,432,925 | 7/1995 | Abraham et al. | 709/301 |
| 5,437,036 | 7/1995 | Stamps et al. | 709/302 |

OTHER PUBLICATIONS (No author given), "Where Plug–Ins Connect", BYTE, pp(1), Aug. 1996.
Gulesian, Marcia, "Plugging into the Web", DBMS, pp(6), Dec. 1996.
Carolan, Mark, Your Own Netscape Plug–in Installer, Dr. Dobb's Sourcebook, pp. (37), Oct. 1996.
Richardson, Robert, "A Plug for Plug–ins", LAN Magazine, pp(2), Jun. 1996.
Greenwald, Rick, "Plug into the Web with OPO 2", Oracle Informant, pp(8), Nov. 1996.
Raynovich, R. Scott, "Netscape Plugs In Apps Developers", LAN Times, pp(2), Mar. 1996.
Adobe Plug–in Source catalog (32 pages), vol. II, No. 1.
Dialog Search Results (48 pages) Database: Computer Database™, File 275, 1983–Nov. 7, 1995. Search Terms: photoshop(s) (plugin or plug()in) (accept or accepts or support of supports or interface).

*Primary Examiner*—Alvin E. Oberley
*Assistant Examiner*—St. John Courtenay, III
*Attorney, Agent, or Firm*—Fitzpatrick, Cella, Harper & Scinto

[57] ABSTRACT

Computer-executable process steps stored on a computer-readable medium to provide an application programming interface (API) to a client application for communicating between the client application and a plug-in module. The API includes a menu-create routine which searches for plug-in modules, which enters information regarding a found plug-in module into a structure, the structure being used to create and to display a plug-in menu of found plug-in modules, an "about" menu-create routine which enters "about" plug-in information into an "about" structure, the "about" structure being used to create and to display a plug-in "about" menu, a menu-enable routine, a menu-disable routine and an invoking routine which permits the client application to utilize a selected plug-in module.

17 Claims, 13 Drawing Sheets

```
                    // Creates a handle to a type of Plug-in host ( a
                    // Photoshop filter, acquire, export, file format
                    // or etc. plug-in host framework) as specified
                    // by the client and returns it to the client.
extern "C" HPLUGINHOST createPluginHost ( const WORD wPluginHostType );

// Destroys the given PluginHost handle for the
                    // client.
extern "C" destroyPluginHost ( HPLUGINHOST hPluginHost,
                    const WORD wPluginHostType );

// Creates the specified plug-in menu (filter,
                    // acquire, export, file format, etc.) for the
                    // client.
extern "C" short createPluginMenu ( HPLUGINHOST hPluginHost,
                    const WORD wPluginType,
                    const WORD wPluginMenuId,
                    const BOOL bPluginMenuExists,
                    const BOOL bAppendToPluginMenuEnd,
                    const WORD wInsertAfterPluginMenuItem,
                    WORD& wFirstPluginCategoryMenuId,
                    WORD& wLastPluginCategoryMenuId );

// Creates the About Plug-in menu for the client.
extern "C" short createAboutPluginMenu ( HPLUGINHOST hPluginHost,
                    const WORD wPluginType,
                    const WORD wAboutPluginMenuId,
                    const BOOL wAboutPluginMenuExists,
                    const BOOL wAppendToAboutPluginMenuEnd,
                    const WORD wInsertAfterAboutPluginMenuItem,
                    WORD& wFirstAboutPluginMenuId,
                    WORD& wLastAboutPluginMenuId );

// Enables the specified plug in menu for the client.
extern "C" short enablePluginMenu ( HPLUGINHOST hPluginHost,
                    const WORD wPluginType );

// Disables the specified plug-in menu for the client.
extern "C" short disablePluginMenu ( HPLUGINHOST hPluginHost,
                    const WORD wPluginType );

// Invokes the specified plug-in item for the client.
extern "C" short invokePlugin ( HPLUGINHOST hPluginHost,
                    const WORD hPluginType,
                    const WORD wPluginMenuId,
                    const WORD wPluginMenuItem,
                    PLUGINDATAPARAMBLOCK& PluginDataParamBlock );

// Invokes the specified plug-in About item for the
                    // client.
extern "C" short invokePluginAbout ( HPLUGINHOST hPluginHost,
                    const WORD wPluginHost,
                    const WORD wPluginMenuItem );

#endif
```

FIG. 7

PLUG-IN MODULE HOST FRAMEWORK

BACKGROUND OF THE INVENTION

1. Field of the Invention

The present invention is a plug-in module hose framework which a client application utilizes to access the functionality of a plug-in module. Particularly, the hose framework provides a simple API to a client application, communicates with a plug-in module via a native and often complex plug-in API and can easily be updated to communicate via new version of the native plug-in API without altering the simple API which the host framework provides to the client application.

2. Description of the Related Art

Many existing software applications support "plug-in" modules and are therefore referred to as client applications to such plug-in modules. These plug-in modules provide the client applications with new or extended services. Plug-ins may, for example, provide specially tailored image filtering functionality to client applications. Adobe Systems, Inc.™ currently offers several client applications which support plug-in modules. One such client application is Photoshop™, a popular image processing application. Due to the popularity of Photoshop, many software companies develop Photoshop-compatible plug-in modules. Because of the abundance of Photoshop-compatible plug-in modules, other image processing client applications must support these modules in order to effectively compete with Photoshop in the marketplace. Accordingly, many prominent image processing applications, such as Corel PHOTO-PAINT™, currently support Photoshop-compatible plug-in modules.

Client applications communicate with plug-in modules through complicated plug-in API's. In the case of Photoshop, the Photoshop native plug-in API is defined by Adobe developers. Accordingly, developers of Photoshop-compatible plug-ins design their plug-ins so as to conform to the Photoshop native plug-in API.

Plug-in API's have become more complex as the functionality provided to client applications through plug-in modules has become more sophisticated. For example, the Photoshop plug-in API is both complex and evolving. This API requires a client image processing application to make numerous complex function calls to a plug-in module and to execute many complex algorithms in order to retrieve, manage and invoke the plug-in module. In addition, these image processing applications must be updated to comply with changes in the Photoshop plug-in API. Moreover, these applications must provide backward-compatibility so as to support plug-in modules written to previous Photoshop plug-in API's.

Due to the foregoing, it is extremely difficult for a client application to establish and maintain compatibility with a plug-in API such as the Photoshop plug-in API. Even if compatibility can be achieved through continual updating of the client application, the cost of updating and rereleasing the client application is often too great to be economically practicable.

Therefore, there is a need for a system which provides a simple API to a client Application through which the client application may access plug-in modules conforming to later-developed plug-in API's.

SUMMARY OF THE INVENTION

It is therefore an object of the invention to provide a host framework which allows a client application to utilize a single simple interface in order to access plug-in modules conforming to any of several past and future native plug-in API's.

According to the invention, an API is provided for communicating between the client application and a plug-in module, the plug-in module extending a base functionality of the client application. The API includes a menu-create routine, callable by the client application, which searches a designated plug-in module storage device for plug-in modules. A plug-in module consisting of a plug-in module interface resource and at least one corresponding plug-in module code resource. After a plug-in module is found, the routine enters information regarding the found plug-in module into a structure, the structure being used to create and to display a plug-in menu of found plug-in modules so as to permit a user to select a particular plug-in module. The API also includes an "about" menu-create routine, callable by the client application, which enters "about" plug-in information into an "about" structure, the "about" structure being used to create and to display a plug-in "about" menu so as to allow a user to select a particular plug-in module. The API further includes a menu-enable routine, callable by the client application, which enables the plug-in menu so that a user may select a particular plug-in module from the plug-in menu, a menu-disable routine, callable by the client application, which disables the plug-in menu so that a user may not select a particular plug-in module from the plug-in menu, and an invoking routine, callable by the client application, which, in a case where a particular plug-in module is selected from the plug-in menu, obtains an entry point routine address for the particular plug-in module and calls an entry point routine corresponding to the entry point routine address so as to permit the client application to utilize the particular plug-in module.

In another aspect, the present invention relates to a host framework for providing functionality of a plug-in module to a client application, the plug-in module extending a base functionality of the client application. The framework includes an abstract plug-in manager base class for locating a plug-in module storage device, for locating specified plug-in modules, and for creating a category list of the specified plug-in modules, and a type manager class, derived from the plug-in manager class, for creating a type information record which contains information for invoking specified plug-in modules, for adding the type information record to the category list, and for associating a plug-in module from the category list with a menu identification value. The apparatus further includes a plug-in category class, used by the abstract plug-in manager base class and by the type manager base class, for managing storage of type information records of a specified category and for retrieving a type information record from the category list, and a plug-in class, used by the abstract plug-in manager base class, by the type manager base class, and by the plug-in category class, for associating a plug-in module with a menu item and for obtaining an entry point address to invoke the plug-in module associated with the menu item.

By virtue of the foregoing, a simple and consistent application programming interface is provided by which a client application may access the services of a plug-in module and which provides the client application with functionality required to support a plug-in module conforming to a complex native API.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 7 is a list of API routines according to the present invention.

DETAILED DESCRIPTION OF THE PREFERRED EMBODIMENTS

Figure 1:
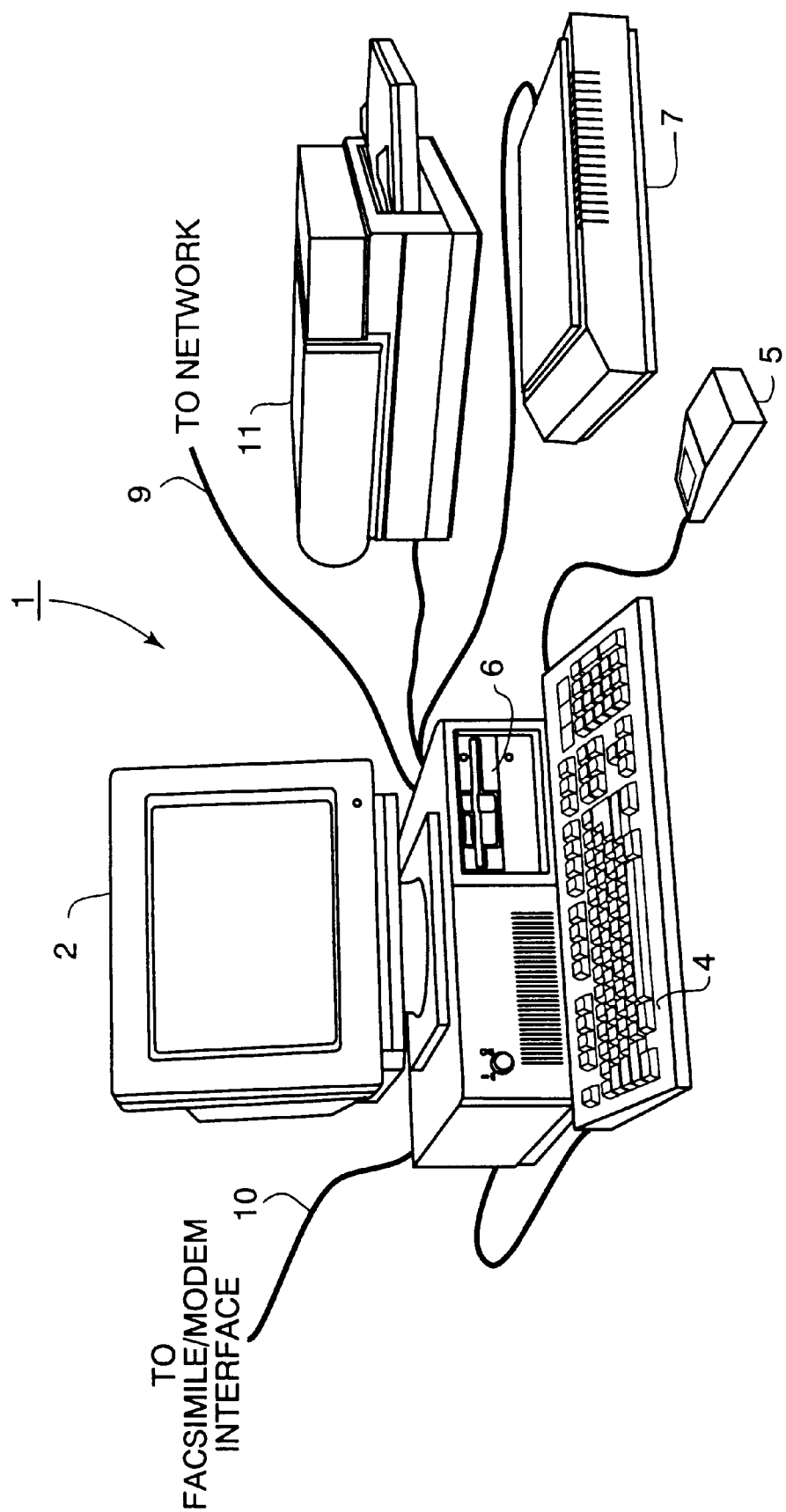
FIG. 1 is a representational view of a computer system embodying the present invention.

FIG. 1 is a representational view of a computer system embodying the present invention. Computer system 1 may be a Macintosh or IBM PC or PC-compatible system having a windowing environment, such as Microsoft Windows. Provided with computer system 1 is display screen 2 which may be a color monitor, keyboard 4 for entering user commands and pointing device 5 such as a mouse for pointing to and for manipulating objects displayed on display screen 2.

Computer system 1 also includes a mass storage device such as computer disk 6 for storing data files, peripheral drivers, application programs, and for storing computer-executable process steps embodying the present invention. Scanner 7 is also included, and may be used to scan documents so as to provide bit map images of those documents to computer system 1. Images may also be input into computer system 1 from a variety of other sources such as from a Local Area Network through network interface 9 or from the World Wide Web through facsimile/modem interface 10 or through network interface 9. Printer 11 is provided for outputting processed images.

It should be understood that although a programmable general purpose computer system is shown in FIG. 1, a dedicated, or stand-alone, computer or other type of data processing equipment can be used to execute the process steps of the present invention.

Figure 2:
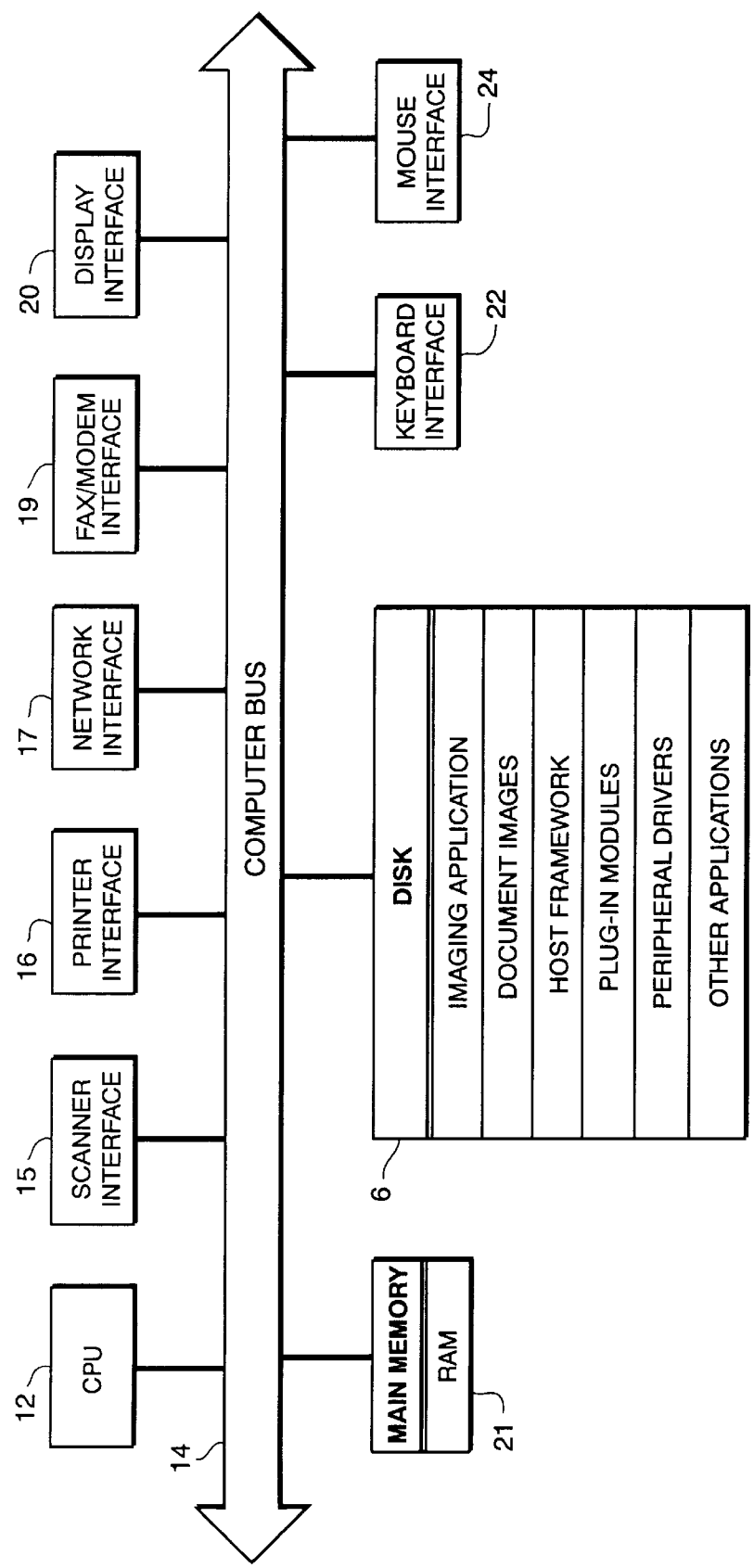
FIG. 2 is a block diagram of the internal architecture of the FIG. 1 computer system.

FIG. 2 is a detailed block diagram showing the internal construction of computer system 1. As shown in FIG. 2, computer system 1 includes central processing unit ("CPU") 12 which interfaces with computer bus 14. Also interfacing with computer bus 14 is canner interface 15, printer interface 16, network interface 17, facsimile/modem interface 19, display interface 29, main random access memory ("RAM") 21, disk 6, keyboard interface 22, and mouse interface 24.

Main memory 21 interfaces with computer bus 14 so as to provide RAM storage to CPU 12 for executing stored processed steps such as process steps to implement a plug-in module host framework according to the present invention. More specifically, CPU 12 loads process steps from disk 6 into main memory 21 and executes the stored process steps from memory 21 in order to provide a plug-in host API to a client application and to communicate to a plug-in module via a plug-in API.

As also shown in FIG. 2, disk 6 contains document images, in either compressed or uncompressed format, peripheral drivers, and other application programs.

Figure 3:
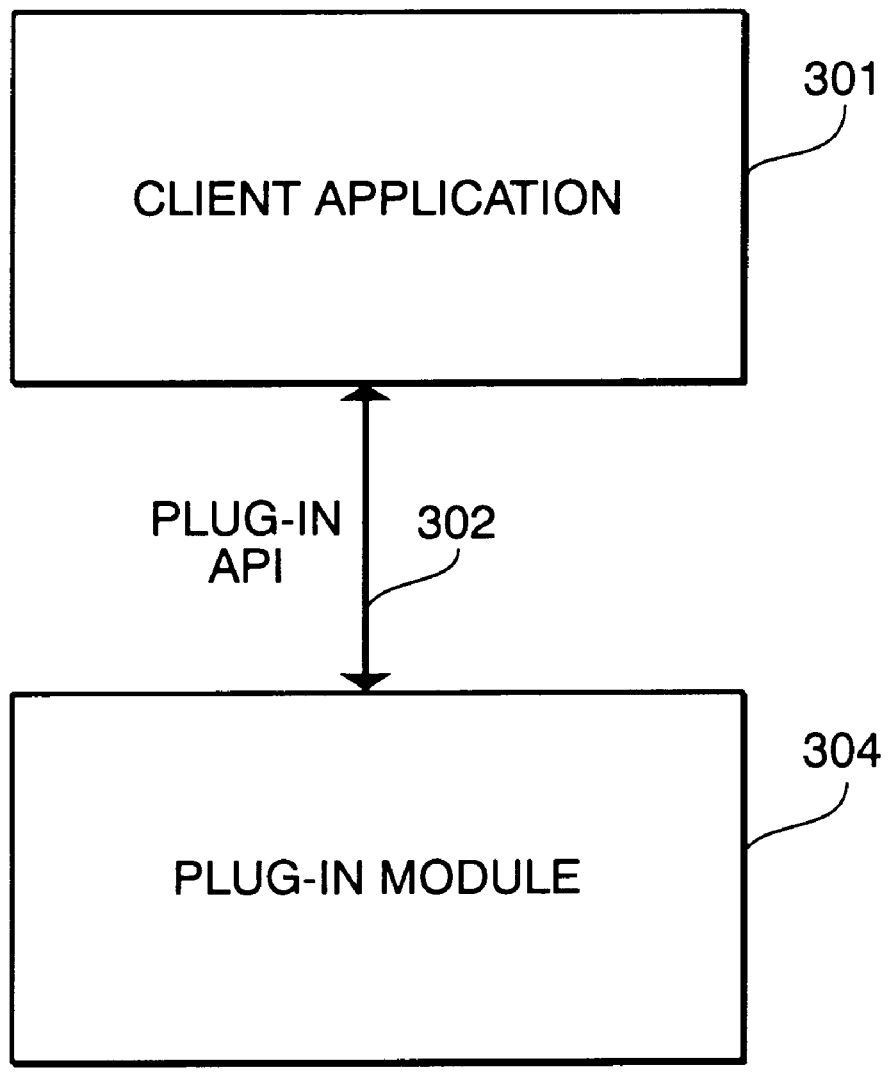
FIG. 3 is a functional block diagram depicting conventional communications between a client application and a plug-in module.

FIG. 3 depicts a conventional scenario addressed by the present invention. As shown in FIG. 3, client application 301 communicates with plug-in module 304 via plug-in API 302. Client application 301 may be any application which supports plug-in modules. In the preferred embodiment described below, client application 301 is an imaging application which hosts Photoshop plug-in modules and plug-in API 302 conforms to Adobe's Photoshop 2.5 Plug-in Development Specification, which is herein incorporated by reference. As described above, the configuration of FIG. 3 is troublesome because client application 301 must be updated to conform with complex and evolving Photoshop plug-in API 302.

In order to provide a better understanding of the operation and structure of the present invention, the following is a brief description of the Photoshop 2.5 Plug-in Development Specification. However, it should be noted that the present invention may be used to host other plug-in modules which conform to other plug-in development specifications.

Photoshop 2.5 Plug-in Development Specification

In the Macintosh operating system, each Macintosh file has a four character file type. A Photoshop plug-in module is a Macintosh file with a file type that corresponds to the plug-in's plug-in category. For example, Photoshop "Filter" plug-ins have a file type of "8BFM". Other plug-in categories are "Acquisition" plug-ins, "Export" plug-ins, "File Format" plug-ins, and "Extension" plug-ins. Although each type of plug-in may be supported by the present invention, the particulars of the Development Specification will be described below with respect to Filter plug-ins.

A Macintosh code resource is a specialized piece of standalone code which resides inside a Macintosh file and which is loaded, locked and executed by computer system 1 through client application 301. All Macintosh resources, including code resources, have a four-character resource Id.

A Photoshop plug-in file contains a plug-in code resource which, in accordance with the above description, has a four character resource Id. The plug-in code resource contains the functionality required by the client application 301. The plug-in file in which each plug-in code resource resides also contains a "PIMI" resource corresponding to each plug-in code resource. The "PIMI" resource contains general and type-specific information about its corresponding plug-in code resource. Both the code resource and the PIMI resource are assigned an identical resource Id. The resource Id used to associate a code resource with its corresponding PIMI resource. Because the plug-in code resources and their corresponding PIMI resources have an identical resource Id, more than one plug-in code resource may be located within a plug-in module.

In order to access plug-in module 304, client application 301 must first detect plug-in module 304. To detect plug-in module 304, client application 301, upon execution, searches specific data folders for plug-in modules. Accordingly, in order for client application 301 to access plug-in module 304, plug-in module 304 must be located in a specific folder. This specific folder is either the folder in which client application 301 resides or in a designated "plug-in" folder. Once client application 301 finds plug-in 304, client application 301 examines the plug-in's type and version number. If the type and version number are supported by client application 301, the plug-in is added to an appropriate menu of client application 301.

Figure 4:
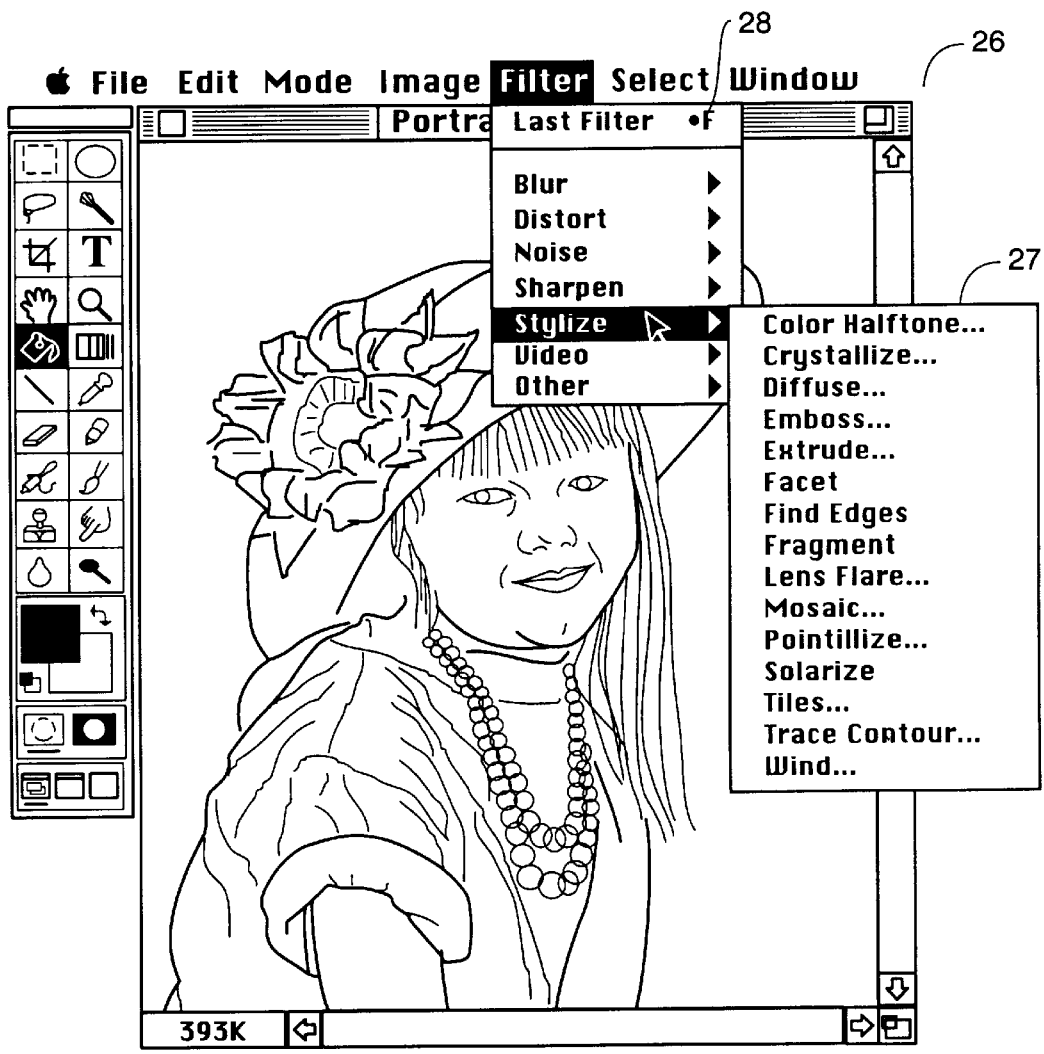
FIG. 4 is a representational view of a graphical user interface of a client image processing application utilizing Filter plug-in modules.

In order to add plug-in modules to a menu, information relevant to each module is entered into a "Filterlist" structure. The Filterlist structure is used to create and to display a hierarchical menu listing found Filter plug-in modules. For example, FIG. 4 is a view showing a graphical user interface 26 of a client imaging application. Filter plug-in menu 28 has been selected and displays names of Filter plug-in categories. As shown in the Figure, the "Stylize" plug-in category has also been selected, activating Stylize plug-in category menu 27. Plug-in category menu 27 displays a list of found plug-in modules of the Stylize plug-in category which are located within the Filterlist structure.

Figure 5:
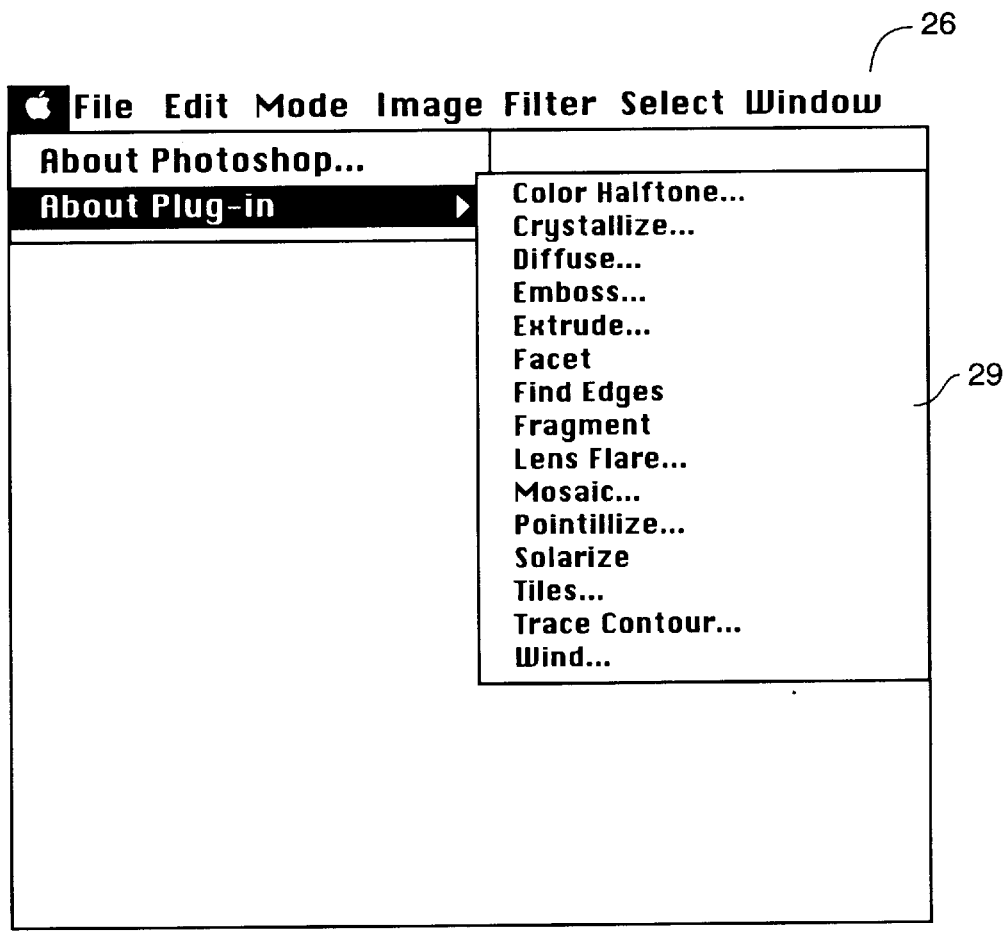
FIG. 5 is a representational view of a graphical user interface of a client image processing application in which an "about" menu is enabled.

Similarly, the Filterlist structure is used to build an "about Filter" plug-in menu. As shown in FIG. 5, "about Filter" plug-in menu 29 is also a hierarchical menu which consists of the names of all Filter plug-in modules which are located by client application 301. In both the "about Filter" and Filter menus, each menu item is linked to an appropriate information structure so that appropriate actions occur in the case that a particular menu item is invoked.

For example, in the case that a plug-in name is selected from the Filter menu, client application 301 invokes corresponding plug-in module 304. To invoke plug-in 304, client application 301 obtains the plug-in code resource's entry point routine address. After obtaining the entry point routine address, client application 301 uses the address to call the code resource of plug-in module 304 using various operation selector values which correspond to the particular task which client application 301 requires the code resource to perform.

Therefore, in accordance with Adobe's Photoshop 2.5 Plug-in Development Specification, client application 301 must provide at least several features. Importantly, each of these features requires clients application 301 to make complex function calls to plug-in API 302.

First, client application 301 must be able to locate a plug-in folder in which plug-in modules reside. In this regard, application 301 should provide the user with means to navigate through available folders in order to locate plug-in modules. Client application 301 should also provide the user with the ability to specify a default plug-in folder to which the initial search for plug-in modules may be limited. Furthermore, client application 301 must be able to present the user with a menu which consists of hierarchical menus of located plug-in modules and plug-in categories, each menu containing a list of plug-in modules of each category, the modules represented by submenu items. Similarly, client application 301 must also provide an interface for displaying "about" boxes corresponding to each located plug-in module. Client application 301 must also be able to, based on a user's selection from a plug-in menu, invoke a selected plug-in module so as to perform a corresponding operation.

Plug-in Host Framework API

Figure 6:
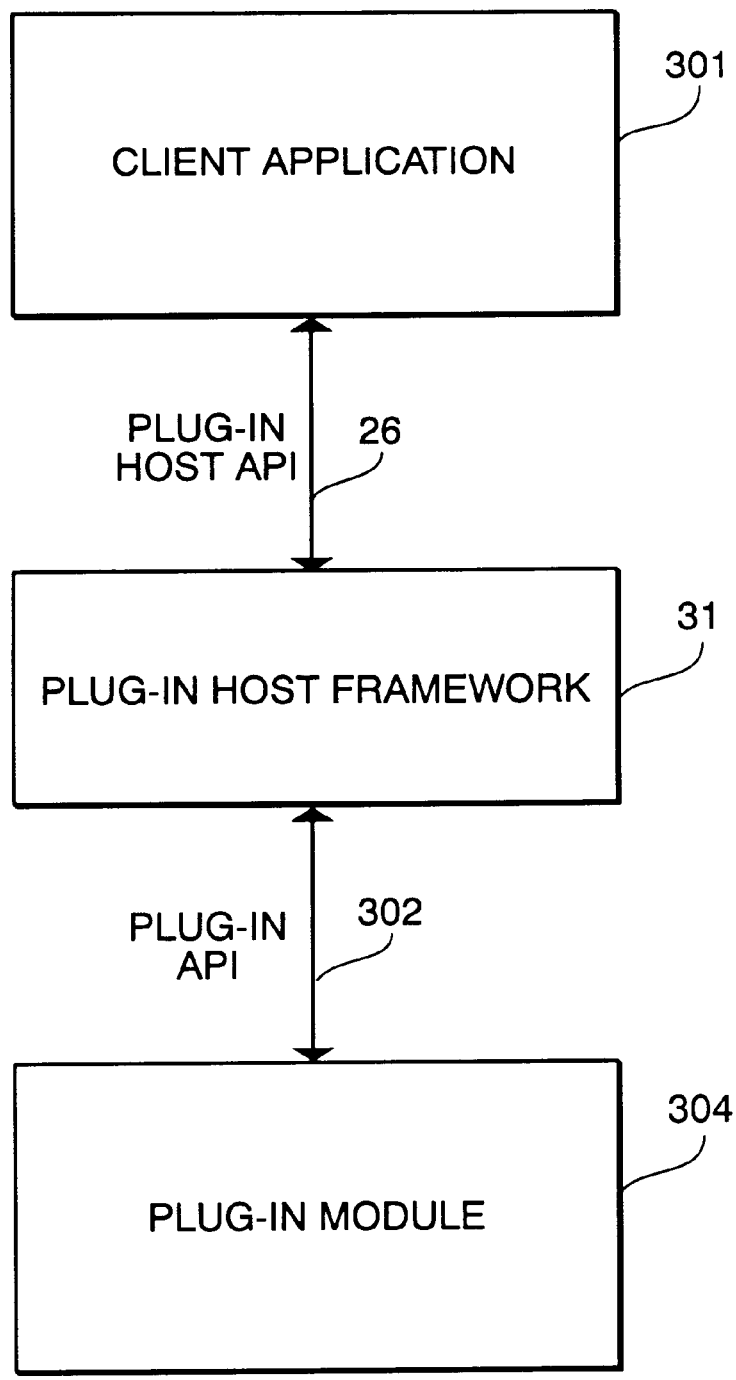
FIG. 6 is a functional block diagram depicting communication between a client application, a plug-in module, and a plug-in module host framework according to the present invention.

Conventionally, client application 301 must utilize plug-in API 302 to fulfill the above functional requirements. However, this utilization is quite difficult due to the complexity of plug-in API 302 and due to periodic modifications of plug-in API 302. As shown in FIG. 6, the present invention addresses the foregoing problems by providing a plug-in host framework 31 which communicates to a plug-in module 304 through a complex and evolving plug-in API 302 and which provides a simple plug-in host API 26 to client application 301 through which client application 301 may access plug-in module 304 so as to perform the above-described functions.

Plug-in host API 26 consists of a few simple routine calls. As mentioned above, plug-in API 302 is revised often. Advantageously, host framework 31 is easily altered so as to support a revised plug-in API while continuing to support plug-in host API 26. Therefore, client application 301 need not be updated in response to changed to plug-in API 302.

The various routines which constitute plug-in host API 26 are summarized below and in FIG. 7.

createPluginHost( )

The createPluginHost routine creates an instance of a host framework object. A wPluginHostType parameter, which is passed as an argument to the createPluginHost call, determines the type of framework which is created. For example, if the wPluginHostType parameter corresponds to Filter plug-in modules, createPluginHost creates a host framework capable of hosting Filter plug-in modules. Alternatively, the wPluginHostType parameter may require the routine to create plug-in host frameworks corresponding to several types of plug-in modules.

CreatePluginHost returns an error code indicating whether its operation was successful and, if not successful, the routine returns a value indicative of the type of error which occurred.

destroyPluginHost( )

In contrast to createPlugin Host, this routine destroys a plug-in host framework object corresponding to a wPluginHostType parameter passed as an argument to the routine. As in the createPluginHost routine, the destroyPluginHost routine returns an error code indicating whether its operation was successful and, if not, the routine returns a value indicative of the type of error which occurred.

createPluginMenu( )

This routine locates a Photoshop plug-in folder. Once the folder is found, the routine examines the folder for specified plug-ins which match the criteria indicated by a wPluginType parameter passed with the call to the routine. The routine then stores a list of specified plug-in categories and their associated plug-ins in a plug-in category list. Next, for each plug-in of the proper type, the routine creates a plug-in information record which contains information required for invoking that plug-in. The created record is added to the plug-in category list. Most importantly, the routine also enables client application 301 to associate a selected menu item and plug-in Id to a corresponding plug-in information record located in the plug-in category list.

Other parameters passed with this routine are as follows:

wPluginMenuId: menu identification value given to the plug-in menu created by the routine;

bPluginMenuExists: indicates whether the specified plug-in menu currently exists in client application 301;

bAppendToPluginMenu: indicates whether the created plug-in menu should be inserted at the end of an existing menu which corresponds to the passed wPluginMenuId value;

wInsertAfterPluginMenuItem: indicates whether the menu should be inserted after a specified item in an existing menu specified by wPluginMenuId;

wFirstPluginCategoryMenuId: returns a plug-in category menu Id corresponding to the first plug-in category menu to client application 301. This returned parameter allows client application 301 to identify the first plug-in category menu of the plug-in menu specified by the wPluginType and wPluginMenuId parameters;

wLastPluginCategoryMenuId: returns the plug-in category menu Id of the last menu to client application 301. This returned parameter allows client application 301 to identify the last plug-in category menu of the plug-in menu specified by the wPluginType and wPluginMenuId parameters.

createAboutPluginMenu( )

This routine is identical to createPluginMenu( ), but creates "about" plug-in menus corresponding to each plug-in module of the type specified by the wPluginType parameter. Of course, only those plug-in modules which provide an "about" feature are designated within the menu.

enablePluginMenu( )

This routine enables the plug-in menu specified by client application 301 via the wPluginType parameter. As shown in FIG. 4, this routine causes plug-in menu 28 to be displayed in a manner indicating that a plug-in module can be selected by a user of client application 301.

disablePluginMenu( )

Figure 8:
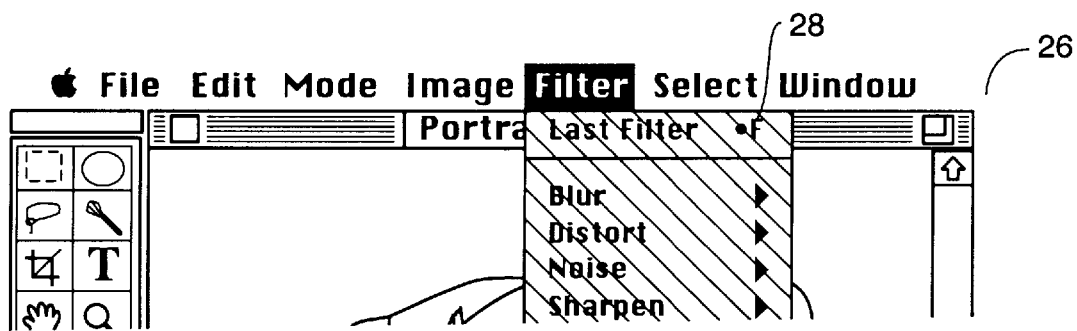
FIG. 8 is a representational view of a graphical user interface of a client image processing application in which a Filter menu is disabled.

This routine disables the plug-in menu specified by client application 301 via the wPluginType parameter. As shown by menu 28 of FIG. 8, this routine provides a visual indication to the user that the plug-in modules of the specified menu cannon be invoked by a user of client application 301.

invokePlugin( )

In accordance with the type of plug-in, menu Id and menu item passed by the client using the wPluginType, wPluginMenuId, and wPluginMenuItem arguments, this routine invokes a specified plug-in. In order to provide the host framework and the specified plug-in module with information and data necessary for execution of plug-in functionality, this routine passes a pointer to a PluginInfoParamBlock structure which contains the necessary information and data. For Filter plug-ins, the information may reflect image size, image type, or actual image data. The structure also includes output field for storing a processed image.

Generally, host framework 31 initially maps the selected plug-in to a plug-in Id stored in the plug-in category list. Next, framework 31 finds the plug-in's entry point address within the plug-in's information record, also stored in the plug-in category list. Third, host framework 31 uses the PluginInfoParamBlock provided by client application 301 to invoke and interact with the plug-in.

invokePluginAbout( )

Similarly to the invokePlugin routine, this routine finds an entry point address associated with a plug-in "about" item specified by the wPluginMenuId and wPluginMenuItem parameter. The address is obtained from a plug-in information record created by the createAboutPluginMenu routine and the routine thereafter invokes an "about" box corresponding to that address.

In a preferred embodiment, the above routines are offered to client application 301 via a DLL wrapper. Accordingly, a developer of client application 301 does not require any knowledge of the internal functioning of host framework 31. In addition, the routines need not be compile into client application 301. Therefore, and because plug-in host API 26 remains unchanged in the preferred embodiment described above, client application 301 is not recompiled in response to revisions to host framework 31 or to plug-in API 302.

Host Framework Object-oriented Architecture

The following is a description of the architecture of plug-in host framework 31's major object classes. Plug-in host framework 31 consists of three major classes, a plug-in manager class, a plug-in category class, and a plug-in class. These classes encapsulate the data and the behavior that are general to all types of plug-ins. Other classes are derived from these major classes and thereby add data and behavior specific to individual types of plug-ins.

FIGS. 9 to 13 show the relationships between the different classes of host framework 31 according to the present invention. In these Figures, each class is represented by a rectangle, arrows point to a class derived from the class located at the opposite end of the arrow, circles indicate a class which utilizes the class located at the non-circled end of the line connecting the classes, and the letter A enclosed in a triangle signifies an abstract base class, which is a class that has no instances in operation.

The Plug-in Manager Class

Figure 9:
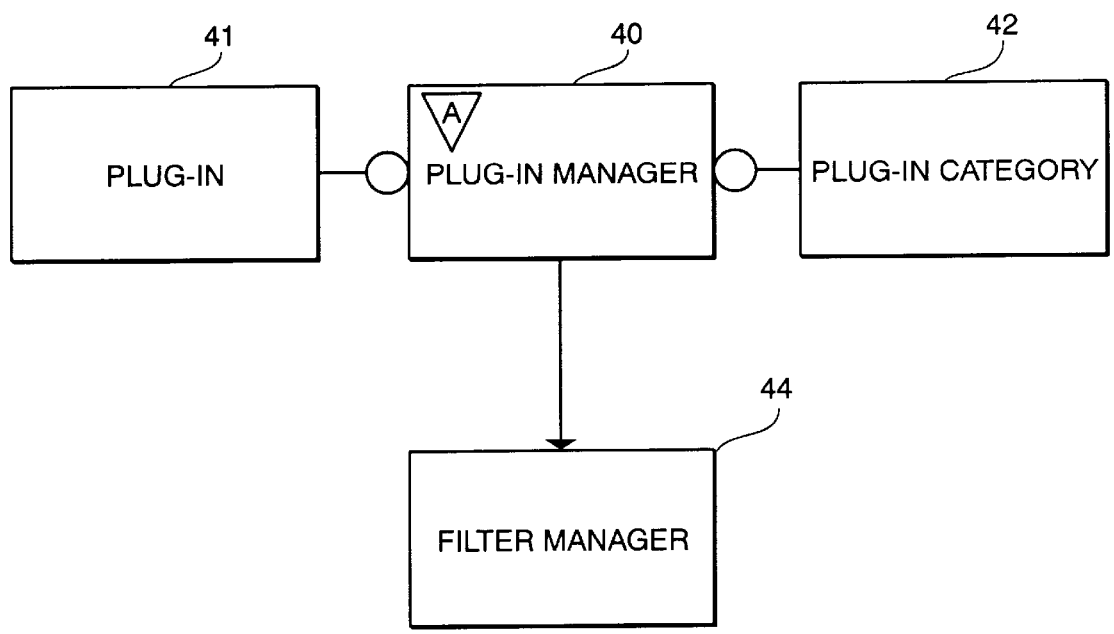
FIG. 9 is a class diagram representing a class hierarchy of a plug-in manager class according to the present invention.

The plug-in manager class contains data and behavior responsible for locating the plug-ins folder, for locating all plug-in modules having the type and version specified by client application 301 and for creating a list of the located plug-in modules. As shown in FIG. 9, plug-in manager class 40 is an abstract base class and uses both plug-in class 41 and plug-in category class 42. In the example shown in FIG. 9, Filter manager class 44 is derived from plug-in manager class 40. Accordingly, in the case that a host framework according to the present invention hosts only Export-type plug-ins, an Export manager class would be derived from plug-in manager class 40.

Figure 10:
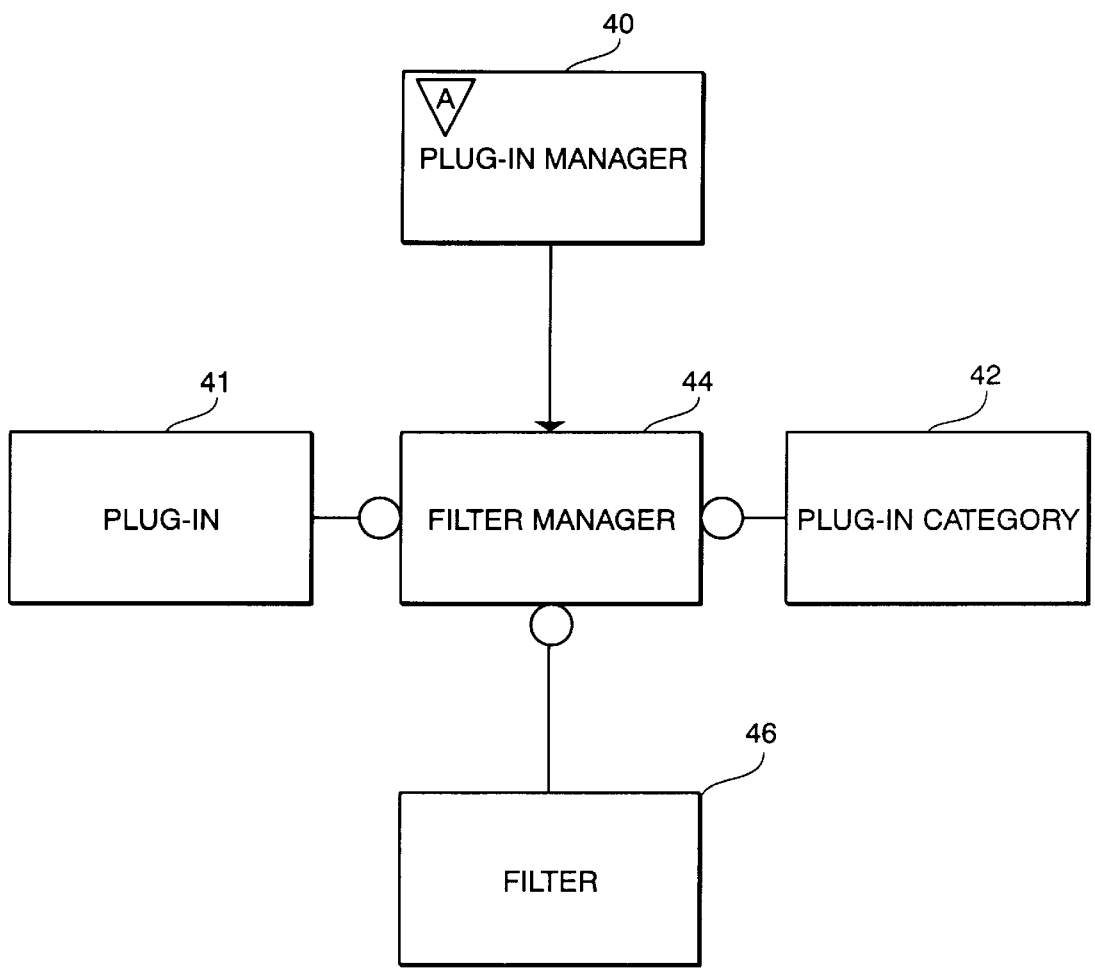
FIG. 10 is a class diagram for describing a class hierarchy of a Filter manager class according to the present invention.

As described in reference to FIG. 9, Filter manager class 44 is derived from plug-in manager class 40. Accordingly, Filter manager class 44 uses plug-in manager class 40's data and behavior to locate the plug-ins folder, to examine the folder for Filter plug-ins of the version which client application 301 instructs host framework 31 to support, and to store a list of Filter plug-in categories and associated Filters in a plug-in categories list. In particular, the Filter manager class creates a Filter plug-in information record which contains all information needed for invoking a specified Filter, adds the Filter plug-in information record to the Filter plug-in category list, and provides a means for associating a Filter plug-in from the Filter plug-in category list with a Filter menu Id. FIG. 10 is a diagram showing the dependencies of Filter manager class 44.

The behavior of each specified plug-in manager class is identical to that of Filter manager class 44. Of course, these specific plug-in manager classes act with respect to their corresponding plug-in types.

The Plug-in Category Class

Figure 11:
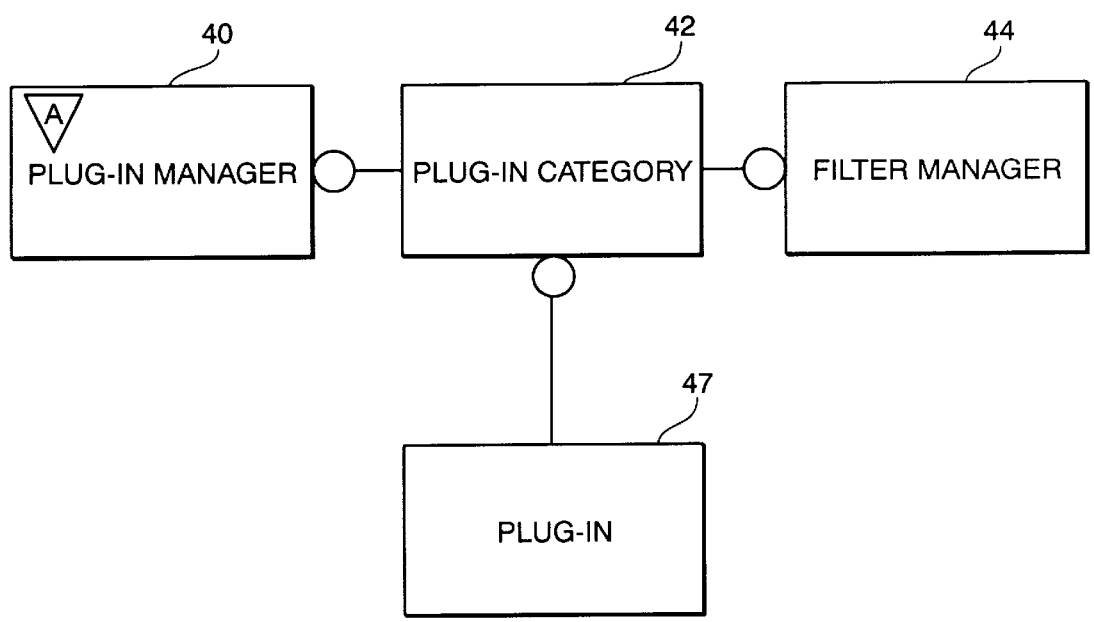
FIG. 11 is a class diagram for describing a class hierarchy of a plug-in category class according to the present invention.

FIG. 11 shows a class diagram for plug-in category class 42. As shown, plug-in category class 42 is used by plug-in manager class 40 and Filter manager class 44. In addition, plug-in category class 42 uses plug-in class 41.

Plug-in category class 42 is responsible for managing storage for all plug-in module records of a specified category. Plug-in category class 42 is also responsible for providing a means for retrieving a desired plug-in record from its corresponding category list.

The Plug-in Class

Figure 12:
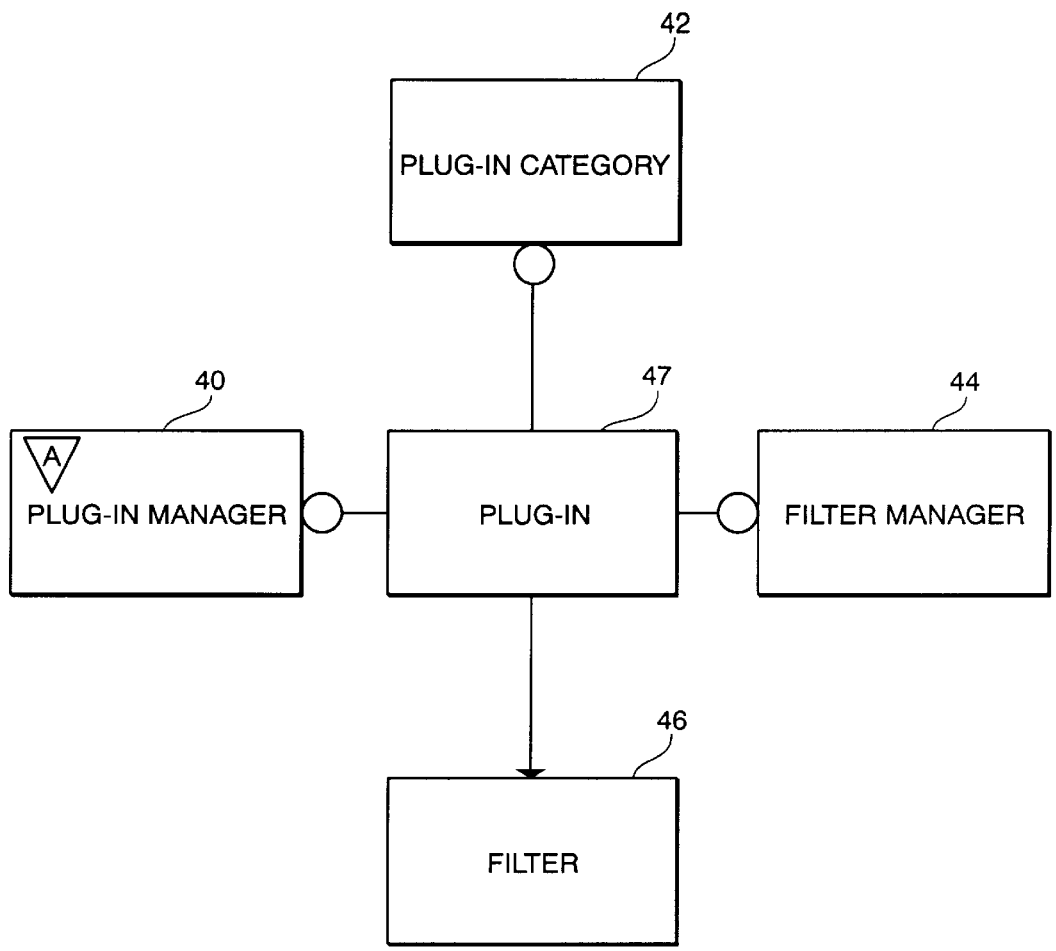
FIG. 12 is a diagram for describing a class hierarchy of a plug-in class according to the present invention.

FIG. 12 is a diagram showing the relationship of plug-in class 41 to other classes of a host framework according to the present invention. Plug-in class 41 is a base class for Filter class 46. Plug-in class 41 encapsulates data and behavior required for associating a plug-in code resource with a menu item, for obtaining an entry point address for invoking the resource and for invoking an "about box" corresponding to that resource.

Figure 13:
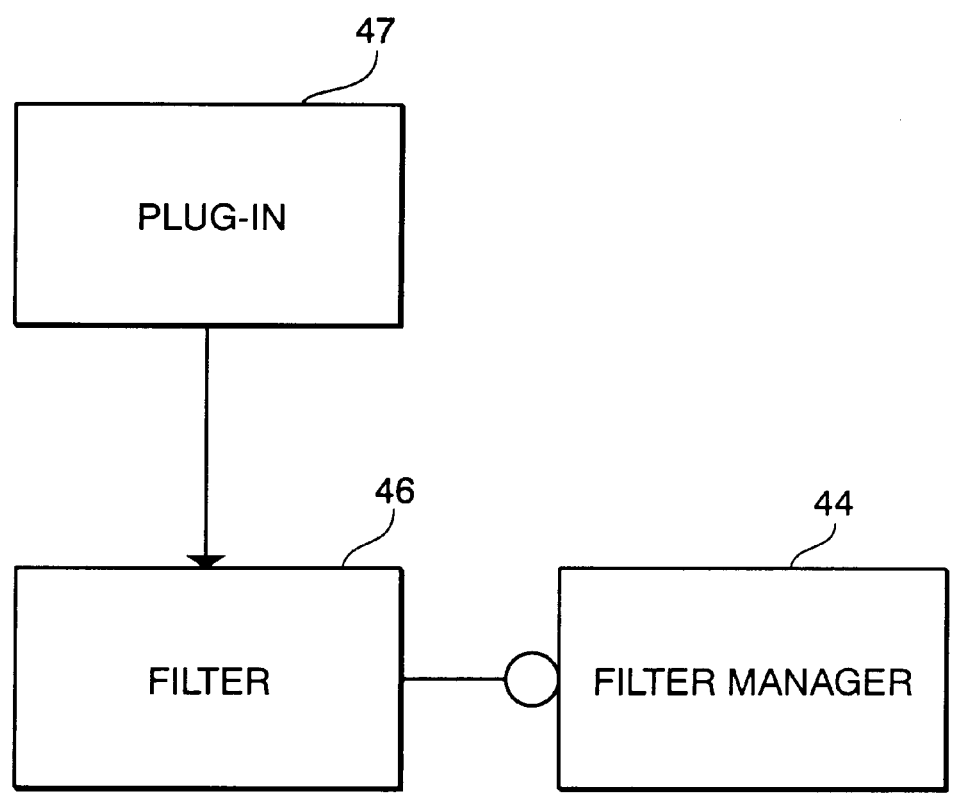
FIG. 13 is a class diagram for describing a class hierarchy of a Filter class according to the present invention.

FIG. 13 shows Filter class 46, which is derived from plug-in class 41 and which uses Filter manager 44. In accordance with this arrangement, and as described above, Filter class 46 encapsulates data and behavior required for associating a Filter code resource with a Filter menu item, for obtaining an entry point address for invoking the resource and for invoking an "about box" corresponding to that Filter resource.

The invention has been described with respect to particular illustrative embodiments. However, it is to be understood that the invention is not limited to the above-described embodiments and modifications thereto, and that various changes and modifications may be made by those of ordinary skill in the art without departing from the spirit and scope of the appended claims.

What is claimed is:

1. Computer-executable process steps stored on a computer-readable medium, the steps executable so as to provide an application programming interface (API) to a client application for communicating between the client application and a plug-in module, the plug-in module extending a base functionality of the client application, said API having routines comprising:

a menu-create routine, callable by the client application, which searches a designated plug-in module storage means for plug-in modules, a module consisting of a plug-in module interface resource and at least one corresponding plug-in module code resource, and which, after a plug-in module is found, enters information regarding the found plug-in module into a structure, the structure being used to create and to display a plug-in menu, the plug-in menu allowing a user to select a particular plug-in module;

an "about" menu-create routine, callable by the client application, which enters "about" plug-in information into an "about" structure, the "about" structure being used to create and to display a plug-in "about" menu, the plug-in "about" menu allowing a user to select a particular plug-in module;

a menu-enable routine, callable by the client application, which enables the plug-in menu so that a user may select a particular plug-in module from the plug-in menu;

a menu-disable routine, callable by the client application, which disables the plug-in menu so that a user may not select a particular plug-in module from the plug-in menu; and an invoking routine, callable by the client application, which, in a case where a particular plug-in module is selected from the plug-in menu, obtains an entry point routine address for the particular plug-in module and calls an entry point routine corresponding to the entry point routine address so as to permit the client application to utilize the particular plug-in module.

2. Computer-executable process steps according to claim 1, wherein the plug-in menu is arranged hierarchically.

3. Computer-executable process steps according to claim 1, wherein said invoking routine, in a case where a particular plug-in module is selected in the plug-in "about" menu, obtains an entry point routine address for the particular plug-in module and calls an entry point routine corresponding to the entry point routine address so as to permit the client application to display information regarding the selected plug-in module.

4. A method for accessing functionality of a plug-in module from a client application, the plug-in module extending a base functionality of the client application, said method comprising the steps of:

calling a menu-create routine which searches a designated plug-in module storage means for plug-in modules, the module consisting of a plug-in module interface resource and at least one corresponding plug-in module code resource, and which, after a plug-in module is found, enters information regarding the found plug-in module into a structure, the structure being used to create and to display a plug-in menu, the plug-in menu allowing a user to select a particular plug-in module;

calling a menu-enable routine which enables the plug-in menu on a display; and calling an invoking routine which, in a case where a particular plug-in module is selected in the plug-in menu, obtains an entry point routine address for the particular plug-in module and calls an entry point routine corresponding to the entry point routine address so as to permit the client application to utilize the particular plug-in module.

5. A method according to claim 4, wherein the plug-in menu is arranged hierarchically.

6. A method according to claim 4, further comprising:

calling an "about" menu-create routine which enters "about" plug-in information into an "about" structure, the "about" structure being used to create and to display a plug-in "about" menu, the plug-in "about" menu allowing a user to select a particular plug-in module; and calling an invoking routine which, in a case where a particular plug-in module is selected in the plug-in "about", obtains an entry point routine address for the particular plug-in module and calls an entry point routine corresponding to the entry point routine address so as to permit the client application to display information regarding the selected plug-in module.

7. A host framework for providing functionality of a plug-in module to a client application, the plug-in module extending a base functionality of the client application, said framework comprising:

an abstract plug-in manager base class for locating a plug-in module storage means, for locating specified plug-in modules, and for creating a category list of the specified plug-in modules;

a type manager class, derived from said plug-in manager class, for creating a type information record which contains information for invoking specified plug-in modules, for adding the type information record to the category list, and for associating a plug-in module from the category list with a menu identification value;

a plug-in category class, used by said abstract plug-in manager base class and by said type manager base class, for managing storage of type information records of a specified category and for retrieving a type information record from the category list; and a plug-in class, used by said abstract plug-in manager base class, by said type manager base class, and by said plug-in category class, for associating a plug-in module with a menu item, and for obtaining an entry point address to invoke the plug-in module associated with the menu item.

8. An apparatus according to claim 7, wherein said plug-in class contains data and behavior for associating the plug-in module with an "about" menu item and for obtaining an entry point address to invoke the plug-in module associated with the "about" menu item.

9. Computer-executable process steps according to claim 1, wherein the API routines are stored in a dynamically linkable library (DLL).

10. Computer-executable process steps according to claim 1, wherein the invoking routine calls the entry point routine with operation selector values corresponding to a task to be performed by the plug-in module.

11. Computer-executable process steps according to claim 10, wherein the operation selector values are determined by the invoking routine so as to isolate the client application from changes in the plug-in module.

12. Computer-executable process steps according to claim 10, wherein the operation selector values are determined by the invoking routine so as to maintain backward compatibility with different versions of the plug-in module.

13. A method according to claim 4, wherein the menu-create routine and the invoking routine are stored in a dynamically linkable library (DLL).

14. A method according to claim 4, wherein the invoking routine calls the entry point routine with operation selector values corresponding to a task to be performed by the plug-in module.

15. A method according to claim 14, wherein the operation selector values are determined by the invoking routine so as to isolate the client application from changes in the plug-in module.

16. A method according to claim 14, wherein the operation selector values are determined by the invoking routine so as to maintain backward compatibility with different versions of the plug-in module.

17. A host framework according to claim 7, wherein when said plug-in class associates the plug-in module with the menu item, said plug-in class is compatible with different version of the plug-in module.

* * * * *

UNITED STATES PATENT AND TRADEMARK OFFICE
CERTIFICATE OF CORRECTION

PATENT NO. : 6,006,279

DATED : December 21, 1999

INVENTOR(S) : Persnaz Neli Hayes

It is certified that error appears in the above-identified patent and that said Letters Patent is hereby corrected as shown below:

```
Column 1
     line 61, change "Application" to --application--.

Column 4
     line 3, change "canner" to --scanner--; and
     line 5, change "29," to --20,--.

Column 12
     line 17, change "version" to --versions--.
```

Signed and Sealed this

First Day of May, 2001

Attest:

NICHOLAS P. GODICI

*Attesting Officer*      *Acting Director of the United States Patent and Trademark Office*